United States Patent [19]

Klein et al.

[11] 4,051,300
[45] Sept. 27, 1977

[54] HOLLOW SYNTHETIC FIBERS

[75] Inventors: Elias Klein, New Orleans; James K. Smith, Slidell; Frederick C. Morton, New Orleans, all of La.

[73] Assignee: Gulf South Research Institute, Baton Rouge, La.

[21] Appl. No.: 662,010

[22] Filed: Feb. 27, 1976

Related U.S. Application Data

[63] Continuation-in-part of Ser. No. 394,335, Sept. 3, 1973, abandoned.

[51] Int. Cl.$^2$ .......................... B05D 3/00; D02G 3/22
[52] U.S. Cl. .................... 428/398; 210/500 M; 264/49; 264/184; 264/177 F; 264/344
[58] Field of Search ............ 210/490, 500 M; 264/41, 264/209, 49, 184, 177 F, 182, 344; 428/398

[56] References Cited

U.S. PATENT DOCUMENTS

| | | | |
|---|---|---|---|
| 2,935,371 | 5/1960 | Magat | 264/184 |
| 2,955,017 | 10/1960 | Boyer | 264/184 |
| 3,180,845 | 4/1965 | Knudsen et al. | 264/182 |
| 3,242,120 | 3/1966 | Steuber | 260/29.6 |
| 3,318,990 | 5/1967 | Kajitani | 264/187 |
| 3,340,340 | 9/1967 | Mytum | 264/168 |
| 3,414,645 | 12/1968 | Morgan | 264/184 |
| 3,674,628 | 7/1972 | Fabre | 161/178 |
| 3,716,614 | 2/1973 | Okamoto et al. | 264/344 |
| 3,957,651 | 5/1976 | Kesting | 264/49 |

*Primary Examiner*—Jay H. Woo
*Attorney, Agent, or Firm*—Martin P. Hoffman; James H. Ewing; Geoffrey L. Chase

[57] ABSTRACT

Hollow synthetic fibers useful in reverse osmosis, ultrafiltration, gas separation and the like, having high hydraulic permeability to the solvent and capable of operation at pressures from 600 psi and up, are prepared by forming a solution of a fiber-forming polymer in a suitable solvent, adding to the solution a second polymer soluble in the solvent but with limited compatibility with the first polymer when their total concentration increases on coagulation, extruding the resulting solution through an orifice equipped for coaxial extrusion so that coagulating fluid within tube flow results, precipitating with a liquid which is miscible with the solvent for the fiber-forming material, is a non-solvent for the first polymer and a solvent for the second, contacting the extruded solution with the precipitating liquid either coaxially through the extrusion device or by passing the extrudate through the precipitating liquid, and finally washing the resulting hollow fiber free of residual solvents and non-solvents, and air drying. The coagulating fluid and the precipitating liquid may be the same material. The coagulating fluid may be air or another gas.

14 Claims, No Drawings

HOLLOW SYNTHETIC FIBERS

This is a continuation-in-part of our application Ser. No. 394,335, filed Sept. 3, 1973, now abandoned.

BACKGROUND OF THE INVENTION

This invention relates to hollow fibers useful in separation schemes such as reverse osmosis, ultrafiltration, and gas separations. The hollow fibers of this invention are designed so that ultrathin coatings can be supported on either their external or internal surfaces, and the composite structure operated at high pressures to effect the separations.

The process of ultrafiltration refers to the separation of a dissolved solute from its solvent (which is generally but not necessarily water), through the application of a pressure gradient. In the ultrafiltration operation solvent permeates the barrier in preference to the solute, so that separation is effected. According to the well understood principles of osmosis, the separation of a solute from its solvent by means of a membrane impermeable to one or more of the components of that solution generates an osmotic pressure in opposition to the gradient of concentration. This pressure is proportional to the molar concentration of the non-permeating species according to the Van't Hoff law. When selective permeation occurs as a result of a pressure gradient under circumstances such that the back osmotic pressure is negligible, the process is termed ultrafiltration. If, however, the process is carried out under circumstances where the back osmotic pressure is significant, the process is generally termed "Reverse Osmosis." The distinctions are somewhat arbitrary in the literature, as is evidenced from the definition given here.

The desirability of performing separations by these techniques has been well documented; the economics of such separations are generally a function of the productivity attainable through the separating membrane, and this productivity is a function of both the specific properties of the membranes, and the conditions under which they can be operated continuously. The significant properties of the separating membranes which relate to productivity are:

a. High hydraulic permeability to the solvent.

b. Good chemical stability in the presence of the solvent, solutes, and incidental components present in the solutions, or mixtures, to be treated.

c. High efficiency in rejecting permeation of the solute to be retained.

d. High values for the Young's modulus of the membrane material under service conditions, so that the process can be operated at high pressures without causing creep failure of the material, or collapse of its morphological structure.

Two general approaches have been taken by previous investigators toward providing separation membranes having desirable properties.

One approach has been to provide homogeneous structures, generally manufactured as thin as practical, with morphologies that are so arranged that there exist pore structures which are capable of allowing solvent to permeate, but are too small for the transport of solutes. Structures of this kind can be termed ultrafilters since they operate by a filtration mechanism. The difficulty of preparing narrow distributions of pore sizes which are capable of selectively retarding certain molecular species has led to the restriction of such membranes to separations limited to high molecular weight solutes where the difference in molar size between the solvent and the solute is sufficient. If a comprise is sought to allow the separation of smaller molecules from solvents, the pore size reduction needed is often so great that the resulting permeability of the membrane is less than can be used practically.

A second approach to this problem has been to prepare separation membranes which operate by allowing only the solvent to diffuse through the membrane structure. However, such membranes exhibit such extremely low rates of solvent transport that they are of no practical interest in such diverse applications as desalination, protein purification, solvent recovery, or separation of organic mixtures. Diffusive membranes are desirable in that they offer the greatest selectivity in separation, and it is known that such barriers prepared in ultrathin form (so that the diffusion path is reduced to less than 1,000 Angstroms) have application in a number of processes.

The preparation of composite membranes consisting of an ultrathin layer contiguous with a more porous substrate has been taught by Loeb, using cellulose acetate as the polymer (Adv., Chem., Ser. 38, 117 ), and by Michaels from acrylonitrile, polysulfone, and polyvinyl chloride (U.S. Pat. Nos 3,526,588 and 3,615,024). Such integral structures have been demonstrated to consist of a dense microporous surface contiguous with a porous support structure. The latter is prepared with as high a porosity as possible to reduce the hydraulic resistance of the support layer.

In an attempt to overcome the difficulties and limitations of forming such a composite membrane from a single polymer (since the requirements for the barrier layer and its support are often diametrically opposed), Riley and Lonsdale ("Development of Ultrathin Membranes," R.L. Riley, H.K. Lonsdale, I.D. Lagrange and C.R. Lyons, O.S.W. R & D Report #386 PB 207036, U.S. Government Printing Office) have disclosed the formation of such membranes by a two-step process. In this procedure the solute rejecting diffusive layer is placed on a porous support which has been preformed; this permits independent consideration for the material needs of each layer. This coating procedure allows the selection of porous supports which are resistant to deformation at high pressures, and at the same time it does not require that the rejecting layer be made from the same material. Consequently, water absorbing surface coatings can be placed as an ultrathin film on a non-water swelling support which will not deform as a result of high pressures in the presence of water.

The requirements for preparation of porous supports for such bicomponent structures are very strict, and have not been met except in restricted instances. The support must have a microstructure which is fine enough to support ultrathin films of the barrier coating without allowing the coating to rupture into the supporting pore as pressure is applied. At the same time, the porous support must exhibit a sufficiently high solvent permeability so that the solvent which has permeated the barrier coating is not retarded further. And finally the porous substrate must be so textured that despite these preceding requirements, it can withstand application of high pressures without failing under creep.

The present invention provides a new technique for preparing such microporous support materials in the form of hollow fibers. While hollow fibers have been described before for chemical separations, none are suitable for the demands outlined here. Asymmetric fibers as described by McLain and Mahon (U.S. Pat. No. 3,423,491) have much higher hydraulic resistances than can be used in this application. Fiber prepared according to the teachings of Michaels (U.S. Pat. Nos. 3,526,588 and 3,615,024) have a pore structure which causes collapse of the fiber walls when pressures in excess of 200 psi are applied. And even fibers made from aliphatic and aromatic nylons have been found to undergo creep failure at pressures in excess of 600 psi.

The fibers described in this invention are capable of operation at pressures up to 2,000 psi, and have hydraulic resistances which are useful in combination with selective ultrathin coatings.

SUMMARY OF THE INVENTION

The preparation of hollow microporous fibers capable of withstanding from 600 psi up to 2,000 psi applied pressure without collapse has been achieved with the discovery of the fiber spinning process detailed in this invention. The fibers are prepared by a solution spinning process which permits formation of a morphology characterized by a uniform cross section of the fibers. The fine structure of the fiber walls is not resolved by examination at 2000x magnification, indicating a pore size of less than 0.1 micron. The uniform texture of the resulting fibers leads to the maintenance of much of the basic polymer mechanical properties, and this permits operation at elevated pressures without collapse of the fine structure.

The pore sizes and porosity of the resultant fibers, while not well understood in terms of quantitative parameters, is sufficient to provide high water permeabilities. In addition, it has been observed that the fiber walls are smoothly textured, and that these fibers can perform their function without the presence of closely regulated skin structures, such as are required by other disclosures in the art.

Th specific fibers described here have been prepared from aromatic polysulfone polymers, and aromatic polyamids, but the invention is not restricted to these materials. Other polymers having an initial modulus in excess of 2,000 psi, and a glass transition temperature at least 20° Celsius higher than the projected use temperature of at least about 15° C can also be employed, as long as the teachings of this invention are followed.

The fibers useful for this invention are prepared by:

1. Forming a solution of a fiber-forming first polymer material in a suitable solvent and adding to the solution a second polymer having an average molecular weight of at least 2000 to form a solution stable on extrusion, but undergoing phase separation when the total polymer concentration increases on coagulation, a. where the sum of the weight percent of the first polymer and the weight percent of the second polymer is at least 15 and not over 65, preferably at least 25 and not over 50, and the ratio of the weight percent of the first polymer to the weight percent of the second polymer is at least 0.5 and not over 55, perferably at least 1.0 and not over 35.0, 2. extruding the resulting solution through an orifice equipped for coaxial extrusion so that fluid within tube flow results, 3. precipitating the first polymer by use of a precipitating liquid miscible with the polymer solvent and a solvent for the second polymer by contacting the extruded polymer solution with the precipitating agent either coaxially through the extrusion device or on the outside of the extrudate by conveying the extrudate through the precipitating agent to form a hollow fiber, and 4. washing the hollow fiber free of residual solvents and non-solvents.

If the two-polymer spinning solution is not stable up to the point of extrusion, voids may occur in the fibers. The solutions used to spin acrylonitrite polymers tend to be unstable and it is necessary to take steps to avoid void formation or to eliminate voids formed in the fibers. Thus Knudsen et al, U.S. Pat. No. 3,180,845, add polyethylene glycol to acrylonitrile polymer solutions to produce void free fibers. Apparently the voids are eliminated in the hot water stretching. The fibers are not microporous.

The combination of solvents and non-solvents useful in this invention are readily selected according to the principles described in an article (Elias Klein and James K. Smith, "The Use of Solubility Parameters for Solvent Selection in Asymmetric Membrane Formation," pages 61–84, in the book Reverse Osmosis Research, edited by H.K. Lonsdale and H.E. Podall, Plenum Publishing Corporation, 227 West 17th Street, New York, New York, 10011) but with the proviso that the conditions for "skin" formation are minimized rather than utilized as taught in the article. Thus the present invention does not rely on the evaporative loss of a solvent or non-solvent for the resultant fiber properties; nor does it require plasticizers as taught in U.S. Pat. No. 3,423,491 by McLain et al, nor does it require the dynamic leaching taught by Michaels. Rather, the present invention is thought to utilize the principles of phase separation, although we do not wish to be restricted by any particular interpretation of the mechanism of fiber formation. The fluid within the tube may be air or other inert gas or it may be a liquid precipitating agent.

DESCRIPTION OF THE INVENTION

A hollow fiber polymer spinning solution comprising the following constituents:

75 gms Dimethyl acetamide (DMA)
15 gms Polysulfone polymer (Union Carbide P-1700)
10 gms Polyvinylpyrrolidone (GAF K40) was prepared by mixing the constituents and filtering the solution through a polypropylene felt. The solution was stable at 90° C., and had a viscosity of 408 cps at 50° C.

Useful hollow fibers were prepared from this solution, but use of more concentrated solutions as in Examples 1 – 6 is preferred.

EXAMPLE 1

A polysulfone hollow fiber was produced by extruding a solution containing 25% polysulfone and 15% polyvinylpyrrolidone in DMA coaxially with a 50:50 DMA:H$_2$O mix. The fiber had a 455 micron O.D. and a 160 micron wall. The hydraulic permeability of the fiber was 17 × 10$^{-5}$ cm/sec atm.

EXAMPLE 2

The solution prepared as in Example 1 above was extruded at a rate of 2.8 cc/min through a die having a center tube located in it through which a mixture of water:DMA in the ratio 50:50 was forced coaxially with the extruding polymer solution. Within a traverse of 10 cm the fluid had formed a hollow fiber with a final outside diameter of 340 microns and an I.D. of 160 microns. The fiber was wound up on an advancing reel at a rate of 20 m/min. After washing, and air drying, the fiber exhibited a hydraulic permeability of $400 \times 10^{-5}$ gm cm$^{-2}$ sec$^{-1}$ atm$^{-1}$.

EXAMPLE 3

The polymer solution prepared as in Example 2, but containing 24% polysulfone and 5% PVP, was extruded through the coaxial extrusion jet, but only dry air was used as the coaxial fluid. The hollow extrudate was collected in water containing a small percentage of DMA. The hydraulic permeability of the fiber after drying was $2 \times 10^{-5}$, and the tensile strength was 8/Kg/cm². The outer diameter was 510 microns and the inner diameter was 255 microns.

EXAMPLE 4

A polymer solution containing 18% polysulfone, 10% PVP, and 72% DMA was extruded coaxially at 35° C. with a water-isopropanol mixture as the quench medium, and then collected after passage through cold water. The hydraulic permeability was $540 \times 10^{-5}$.

EXAMPLE 5

A solution containing 24% polysulfone, 10% polyvinylpyrrolidone, and 66% DMA was extruded coaxially with a dry air stream, and collected in water. The fiber dimensions were 460 microns O.D., and 270 microns I.D. The hydralic permeability of the fiber was $95 \times 10^{-5}$ cm/sec atm. The tensile strength of the fibers was 88 Kg/cm².

EXAMPLE 6

A solution containing 59 gms DMA, 26 gms polysulfone and 15 gms PVP, had a viscosity of 16,400 cps at 50° C. The extrusion of this solution at 50° C using 75:25 DMA:H₂O as the non-solvent for the polysulfone yielded a fiber having a hydraulic permeability of $165 \times 10^{-5}$, with an elastic modulus of 2200 Kg/cm², a wall thickness of 101 microns and a diameter of 221 microns. The failure pressure can be calculated using the relationship $$P = \frac{2E}{(1 - \nu^2)} \frac{t^3}{D^3}$$

The fiber is capable of withstanding 6,567 psi applied pressure.

EXAMPLE 7

A polysulfone hollow fiber was produced by extruding into air a solution containing 30% polysulfone (average molecular weight 3500) and 20% polyvinylpyrrolidone (average molecular weight 40,000) in DMF (dimethylformamide) with a viscosity of 120,000 cp at 50° C. The extrudate was quenched in water containing 2% DMF and 0.1% sodium dodecyl sulfate, using air as the internal quench medium. The fiber had an internal diameter of 83 microns and a wall thickness of 90 microns. The hydraulic permeability (LP) was $$44 \times 10^{-5} \frac{cm}{sec\ atm}$$

When operated under ultrafiltration conditions at 1000 psi, the permeation rate of water was 95 GF²D.

EXAMPLE 8

The process of Example 7 was repeated using polyvinylyrrolidone having an average molecular weight of 10,000. The solution had a viscosity of 62,000 cp. The fiber had an internal thickness of 78 microns. The hydraulic permeability (LP) was $$100 \times 10^{-5} \frac{cm}{sec\ atm}$$

When operated under ultrafiltration condition at 1500 psi, the permeation rate of water was 170 GF²D.

EXAMPLE 9

The process of Examples 7 and 8 was repeated using 35% polysulfone (average molecular weight 3500) and 20% polyvinylpyrrolidone having an average molecular weight of 40,000. The solution had a viscosity of 220,000 cp. The fiber had an internal diameter of 100 microns and a wall thickness of 110 microns. The liquid permeability (LP) was $$35 \frac{cm}{sec\ atm}$$

When operated under ultrafiltration conditions at 1300 psi, the permeation rate of water was 130 GF²D.

EXAMPLE 10

Polysulfone hollow fibers were produced by extruding, as in the above examples, DMA solutions containing 24% polysulfone and 10% various additives. The additives, the solution viscosities, and the fiber properties are set forth in the table.

TABLE

| Additive | Viscosity cp | Hydraulic Permeability LP ($10^{-5}$) cm/sec-atm | Inside Diameter u m | Wall Thickness u | Pore Size Range u |
| --- | --- | --- | --- | --- | --- |
| Polyvinyl-pyrrolidone | 12,640 | 31 | 243 | 53 | 0.19–0.25 |
| Methyl-cellulose | 2,223 | 154 | 101 | 106 | 0.44–0.28 |
| Polyethylene-glycol | 4,660 | leaked | 216 | 86 | large |

The hollow fiber spun from the solution containing polyethylene glycol had large voids in its wall structure. Electron microscopy showed that these voids tend to rupture under moderate external pressure.

EXAMPLE 11

A solution of a fiber forming aromatic polyamide, as exemplified by the structure:

Where n (average) is 180, was prepared using 15% of the aromatic polyamide, 15% of the polyvinylpyrrolidone and 70% of dimethylacetamide. The extrudate was quenched by an internal stream containing 50% isoproponal and 50% water. The resulting fiber has a porosity in excess of 60%, and can be used as a support for thin fiber.

In the above examples, the void volume or porosity is 55% to 80%.

The void volume or porosity may be calculated as follows:

Percent Void Vol +

$$\left( \frac{\left(\frac{wt}{p}\right) H_2O}{\left(\frac{wt}{p}\right) H_2O + \left(\frac{wt}{p}\right) polymer} \right) - 100$$

where wt = mass and p = polymer density.

What is claimed is:

1. In the method of forming a microporous high strength hollow fiber suitable for reverse osmosis, ultrafiltration and gas separations, said fiber having a continuous axial channel, said micropores having a size range less than 0.25 microns and said fibers capable of withstanding over 600 psi of applied pressure, the steps comprising:
   a. forming a solution of a fiber-forming polymer, and adding to said solution a second polymer consisting of polyvinylpyrrolidone having an average molecular weight of at least 2000 to form a stable two polymer solution from which the two polymers separate on coagulation, where the sum of the weight percent of the fiber-forming polymer and the weight percent of the second polymer of polyvinylpyrrolidone is at least 15 and not over 65, and the ratio of the fiber-forming polymer to the weight percent of the second polymer of polyvinylpyrrolidone is at least 0.5 and not over 55;
   b. extruding the resulting polymer solution through an orifice equipped for coaxial extrusion;
   c. contacting the extrudate with a precipitating liquid that is miscible with the solvent for the fiber-forming polymer, is a non-solvent for the fiberforming polymer, and is a solvent for the second polymer of polyvinylpyrrolidone, and
   d. washing the resulting hollow fiber substantially free of residual solvents and non-fiber-forming material.

2. The process of claim 1 in which the sum of the weight percent of the fiber-forming polymer and the weight percent of the second polymer is at least 25 and not over 50.

3. The process of claim 1 including the drying of the washed hollow fiber.

4. The process of claim 1 in which the fiber-forming polymer is an aromatic polysulfone.

5. The process of claim 1 in which the fiber-forming polymer is an aromatic polyamide.

6. The process of claim 4 in which the solvent for the fiber-forming polymer is dimethyl acetamide.

7. The process of claim 1 in which the solvent for the fiber-forming polymer is dimethylformamide.

8. The process of claim 6 in which the precipitating liquid is a mixture of dimethyl acetamide containing at least 25% water.

9. The process of claim 7 in which the precipitating agent is an aqueous solution of dimethylformamide.

10. The process of claim 1 in which the precipitating liquid is introduced coaxially through the extrusion device.

11. The process of claim 1 in which an inert gas is introduced coaxially through the extrusion device to coagulate the polymer solution.

12. The process of claim 1 in which the precipitating liquid is a mixture of water and isopropanol.

13. A microporous high strength hollow fiber suitable for reverse osmosis, ultrafiltration and gas separation, said fiber having a continuous axial channel, said micropores having a size range less than 0.25 microns and said fiber capable of withstanding at least 600 psi of applied pressure made by the process of claim 1.

14. The process of claim 1 in which the ratio of the weight percent of the fiber-forming polymer to the weight percent of the second polymer is at least 1.0 and not over 35.0.

* * * * *